(12) United States Patent
Markowz et al.

(10) Patent No.: US 8,475,576 B2
(45) Date of Patent: Jul. 2, 2013

(54) COMPONENT FOR PRODUCING VACUUM INSULATION SYSTEMS

(75) Inventors: Georg Markowz, Alzenau (DE); Thorsten Schultz, Hassenroth (DE); Juri Tschernjaew, Aschaffenburg (DE); Farid Usmanov, Mannheim (DE); Wojciech Pisula, Mainz (DE); Ruediger Schuette, Alzenau-Hoerstein (DE)

(73) Assignee: Evonik Degussa GmbH, Essen (DE)

( * ) Notice: Subject to any disclaimer, the term of this patent is extended or adjusted under 35 U.S.C. 154(b) by 245 days.

(21) Appl. No.: 13/003,006

(22) PCT Filed: Jul. 9, 2009

(86) PCT No.: PCT/EP2009/058710
§ 371 (c)(1),
(2), (4) Date: Jan. 7, 2011

(87) PCT Pub. No.: WO2010/003993
PCT Pub. Date: Jan. 14, 2010

(65) Prior Publication Data
US 2011/0129398 A1 Jun. 2, 2011

(30) Foreign Application Priority Data
Jul. 11, 2008 (DE) .......................... 10 2008 040 367

(51) Int. Cl.
*F16L 59/065* (2006.01)
*B01J 20/00* (2006.01)

(52) U.S. Cl.
USPC ................................ 96/108; 423/230; 428/69

(58) Field of Classification Search
USPC ................................ 96/108; 423/230; 428/69
See application file for complete search history.

(56) References Cited

U.S. PATENT DOCUMENTS

| 3,114,469 | A | * | 12/1963 | Francis et al. | ........... 220/592.27 |
|---|---|---|---|---|---|
| 4,046,407 | A | * | 9/1977 | Porreco | .................... 285/123.17 |
| 4,272,259 | A | * | 6/1981 | Patterson et al. | ................. 95/95 |
| 4,938,667 | A | * | 7/1990 | della Porta | ..................... 417/48 |
| 5,200,015 | A | | 4/1993 | Schilf | |
| 5,518,138 | A | * | 5/1996 | Boffito et al. | ............ 220/592.27 |
| 5,532,034 | A | * | 7/1996 | Kirby et al. | ..................... 428/69 |
| 7,789,949 | B2 | * | 9/2010 | Sparks et al. | ................... 96/132 |
| 2004/0141850 | A1 | | 7/2004 | Eberhardt et al. | |
| 2007/0209516 | A1 | | 9/2007 | Hirose | |

FOREIGN PATENT DOCUMENTS

| DE | 40 16 048 | 10/1991 |
|---|---|---|
| DE | 101 07 651 | 8/2002 |
| EP | 1 835 221 | 9/2007 |
| FR | 2 573 820 | 5/1986 |

OTHER PUBLICATIONS

International Search Report Issued Oct. 21, 2009 in PCT/EP09/058710 filed Jul. 9, 2009.

* cited by examiner

*Primary Examiner* — Frank Lawrence, Jr.
(74) *Attorney, Agent, or Firm* — Oblon, Spivak, McClelland, Maier & Neustadt, L.L.P.

(57) ABSTRACT

The present invention relates to a component for producing vacuum insulation systems, comprising at least one insulation layer which is surrounded by a casing, wherein the gas pressure in the insulation layer can be reduced by means provided in the component, wherein the means for reducing the gas pressure is embodified as activatable. The present invention further describes a vacuum insulation system comprising a component according to the invention.

16 Claims, No Drawings

COMPONENT FOR PRODUCING VACUUM INSULATION SYSTEMS

The present invention relates to a component for producing vacuum insulation systems. The present invention further describes insulation systems comprising or obtainable from a component according to the invention, and also a process for producing vacuum.

As fossil sources of energy become scarcer and the need for measures to control global warming becomes more acute, energy-saving technologies and the economical transportation of energy and also the interim storage of useful energy generated in a resource-preserving manner gain increasing importance. One important aspect here consists in improving insulating materials long used in many fields.

District heating and other heat transfer systems transport heat by means of suitable transfer media (usually thermal oil, water or superheated steam) from a producer to a consumer. Owing to their high capital costs and the heat losses involved in this mode of transportation, such systems at the current state of the art are only economical for comparatively short transfer distances (typically <20 km from producer to consumer). Conventional systems are line insulated using either various fibrous materials (glass/rock wool, partially impregnated with insulation powders and/or carbon black) or else insulating foams (usually based on polyurethane). In all cases, the pore space is at atmospheric pressure. The heat loss in state of the art grids typically amounts to about 10-100 W/(m line length) depending on line cross-section and operating conditions. Classic vacuum insulations (for example in the form of pre-insulated moldings or pipe-in-pipe technology) have hitherto not been used because of the high capital costs and the insufficient service life of the requisite vacuum.

All conventional insulating materials for building insulation (apart from glass insulation systems) are based on porous materials holding air (or rarely other gases as well) at atmospheric pressure in their pore space. This means that insulation quality is in any case limited. Conventional vacuum insulation panels (VIPs) are at the state of testing and commercial launching, but are often still too costly. Particularly, however, they are preshaped and their dimensions cannot be conformed to local needs on the building site. They can neither be trimmed to shape nor are they flexible enough to be able to conform to curved surfaces or even room corners. This limits new buildings with regard to shapes and dimensions, and the retrofitment of existing buildings is significantly compromised by the geometric inflexibility of the VIPs.

In addition, insulating materials are also used in the manufacture of classic household appliances, such as refrigerators and deep-freezers.

Almost all built structures transport hot tap water as well as heating water through pipework lines typically thermally insulated by foam 10-20 mm in thickness. However, the insulating performance of such systems is limited, since atmospheric pressure prevails in the pore space of the insulation. Accordingly, there are noticeable losses of heat into the surrounding walls, floors, the soil or the ambient air. These losses are critical in those local areas in particular where no heating energy whatsoever is required, i.e., in basement rooms, exteriors, roof regions, etc. Conventional vacuum insulations are distinctly too costly and inflexible in handling. Given the current trend toward more easily and quickly installable flexible plastics pipe systems even in the outfitting sector, these disadvantages weigh particularly heavily.

Industry uses a lot of energy to heat up reactors and apparatuses and/or maintain them at certain temperatures. Conventionally, such equipment is thermally insulated with one or more layers of glass/rock wool or, in the high-temperature sector, with porous ceramic materials. Owing to the often very high temperature differences relative to the environment (often more than 200 kelvins), the poor insulating effect of these materials results nonetheless in appreciable thermal losses, which have to be compensated by increased heating. Double-wall technology (similarly to Dewar vessels) is almost always foreclosed by the high capital costs and the often very complex geometry of the apparatuses (i.e., extreme engineering expense and inconvenience).

Similarly to classic building insulation, there is a need in the field of refrigerated goods logistics for insulation systems that minimize undesired injections of heat into refrigerated spaces and transportation receptacles. Conventional insulation there usually consists of foams or fibrous systems where the pore space is at atmospheric pressure. This means that the insulating performance is limited in principle. Conventional vacuum insulation systems (VIPs) are only used in selected areas because of their high cost and their inflexible processing.

In addition, insulation is also used in the manufacture of means of transport, more particularly aircraft. Owing to the large temperature differences between the cabin and the outside (up to 100 kelvins in the case of commercial airplanes, up to 300 kelvins in the case of aerospace vehicles), aircraft and spaceship interiors have to be thermally insulated from the outside in order that the conditioning requirements may be minimized (power fuel saving) and condensation may be prevented. At the same time, this insulation layer has to be flame resistant and lightweight and also, preferably, contribute to the mechanical stiffness of the entire casing structure. Conventionally, insulating mats of polyimide and other high-performance plastics (polyaramid etc.) and also insulating materials based on glass fiber and powder are used. The pore space in these materials is usually at cabin interior pressure, i.e., around 800-1000 bar. Vacuum insulation systems are only used in exceptional cases owing to their high price and because their film exteriors are scarcely obtainable in low-flammability plastics.

All these fields are accordingly experiencing a rising demand for effective thermal insulating materials of construction.

Inexpensive insulating materials insulate at normal pressure, i.e., the pore space in the insulating material is at an absolute pressure equal to the atmospheric pressure of air. As a result, these materials are simple and safe to use. However, a disadvantage is that the insulating effect is relatively low because of the high thermal transportation performance of gases.

Materials have accordingly been developed to minimize this thermal transportation through the use of vacuum. However, an underpressure can only be generated and maintained within mechanically stable systems which will not collapse under vacuum.

Line systems for transporting cold liquids are outlined inter alia in the documents DE-A-36 30 399, U.S. Pat. No. 4,924, 679, DE 692 02 950 T2, DE 195 11 383 A1, DE 196 41 647 C1, DE 695 19 354 T2, DE-A-20 13 983 and WO 2005/043028.

Various approaches to insulating such line systems have hitherto been pursued. Some of the systems outlined above describe pipework lines having double walls wherein the void space between the walls is evacuated and may be additionally filled with insulating material (powder and/or fibers) to arrive at a "pipe-in-pipe" construction. This solution largely corresponds to conventional Dewar vessels. Other outlined systems describe prefabricated moldings exactly conformed to the geometries of the components to be insulated, for example like half-shells placed around the components to be insulated, from both sides, and fixed thereto. Systems are lastly described which consist of individual closed-off and already evacuated regions which are connected to each other flexibly and thus form a larger assembly which typically has limited bendability (rollability) in one direction, so that for example cylindrical bodies (pipes, containers) can be contour-huggingly encased. What is common to all these systems is that as early as when the vacuum is being applied, the later shape of the component to be enclosed has to be substantially predetermined or at least taken into account. None of these systems, moreover, make it possible to achieve complete enclosure of a component to be insulated without edges or seams extending in the heat transfer direction (so-called heat bridges). The sometimes excellent insulating properties of such insulated components in the area thereof thus are compromised in practical use by numerous unavoidable heat bridges at the transitions from one insulated component to the next. The overall effective insulating performance of a stretch of pipework for cold or hold media that is insulated in this way is therefore typically distinctly too bad for transportation over longer distances. In addition, owing to the stiffness of the individual evacuated regions of these insulated components, their processing is often difficult and geometrically greatly constrained.

Accordingly, these systems have in principle but limited suitability for constructing line systems through which appropriate media can be transported cold or hot.

Printed publications EP-A-0 618 065, EP-A-0 446 486, EP-A-0 396 961 and EP-A-0 355 294 disclose specifically plate-shaped vacuum insulation systems which offer a particularly high thermal insulating performance. These vacuum insulation systems can be used for insulating refrigerators for example. These moldings comprise a gastight casing filled with an insulating material. After evacuation of the insulation layer by mechanical pumping and the closure of the casing, the molding becomes rigid. Since the shape of the insulation systems cannot be changed at installation, these moldings are predominantly used in plate form. True, other shapes can be produced, but their processing is correspondingly costly and inconvenient.

In the case of particularly complex insulation systems, the vacuum may only be produced following installation, for example by pumping. This is described particularly in connection with the previously outlined insulation systems. However, producing vacuum by pumping has many disadvantages, and so systems of this type have hitherto not been used for extended line systems. For instance, the time needed to achieve an adequate vacuum increases with the distance between the various evacuation points and proves to be very problematical in the case of very finely divided materials in particular. An aerogel, for instance, does provide excellent insulating, but the time for which the pumps have to be run to achieve an adequate insulating effect is extremely long. Using a more coarsely structured material does reduce the time needed for evacuation, but at the same time the insulating material obtained has a higher thermal conductivity at the same residual gas pressure (at the same vacuum) than a more finely divided material. Last but not least, evacuating gives rise to appreciable pumping energy requirements. It is for these reasons that systems of this type have hitherto failed to become established. In mass manufacture of refrigerators for example, subsequent production of the vacuum is likewise only difficult to realize since the cycle times are dictated by the length of the evacuation time.

When a system is cooled by a fluid to be transported, a vacuum corresponding to the use of pumps can be produced by freezing out gases. However, vacuum production by solidification of gases is only possible for line systems through which a correspondingly cold medium flows. This mechanism is not applicable for the above-described district heating systems, which were outlined as one of many examples.

In addition, WO 2005/043028 describes a combination of metals and hydrogen, useful for lowering the gas pressure within the layer of insulation. The difficult handling of this system is disadvantageous, however. Printed publication EP 347 367 discloses the production of vacuum in a hollow body by heating a metal hydride to release hydrogen which displaces the air. Thereafter, the system is sealed. Owing to the cooling, the hydrogen present in the hollow body is absorbed by the metal to form metal hydride, so producing a vacuum. However, the temperatures needed are very high, and so this system for forming vacuum has hitherto failed to become established in the line systems described in WO 2005/043028.

In view of the prior art herein indicated and discussed, it is an object of the present invention to provide a component for producing vacuum insulation systems which has an excellent portfolio of properties.

This portfolio of properties comprises more particularly a high robustness at installation of the component and at operation of insulation systems obtainable from the components. The component should further provide excellent insulation irrespective of any cold medium flowing within an insulation system.

It is a further object, more particularly, to provide a component having high insulating effect and being simple to process. Here, the component should also be usable for insulating complex geometries. The component should further not lead to excessively long cycle times in mass manufacture.

The component should further be suitable for achieving a particularly high insulating performance. The necessary low thermal conduction for this should be achieved in a very economical manner. More particularly, there should be no need for long pumping times, which are generally associated with high costs.

It is a further object to provide such components and insulation systems in an economical manner.

We have found that these objects, as well as others which, although not actually mentioned explicitly, can be inferred as obvious from the context discussed here or are necessarily apparent therefrom, are achieved by the component described in claim 1. Advantageous modifications of this component are protected in the subclaims referring back to claim 1. With regard to an insulation system and also the process for producing a vacuum, claims 13 and 15 respectively provide a solution to the underlying problems.

The present invention accordingly provides a component for producing vacuum insulation systems, comprising at least one insulation layer which is surrounded by a casing, wherein the gas pressure in the insulation layer can be reduced by means provided in the component, characterized in that the means for reducing the gas pressure is embodied as activatable.

The measures of the present invention surprisingly succeed in providing a component for producing vacuum insulation systems and also an insulation system obtainable therefrom with an excellent portfolio of properties.

The portfolio of properties comprises more particularly a high safety level at installation of the component and at operation of insulation systems obtainable from the components. Accordingly, these components or vacuum insulation systems cannot represent any direct danger to people, the environment or property. This statement does of course exclude dangers due to any media, electric power lines, data transfer lines or hot or cold surfaces within the system constituents enclosed by means of the components or insulation systems described herein. Furthermore, these components can even be installed by unskilled personnel following brief induction, and the vacuum insulation systems obtained thereby can also be put into operation by these people.

Furthermore, the component makes it possible to achieve excellent thermal insulation irrespective of any cold medium flowing within an insulation system. The requisite low thermal conduction is very inexpensive to obtain. More particularly, there is no need for long pumping times, which are generally associated with high costs.

The present invention components and insulation systems are inexpensive to provide. These cost advantages can be enhanced through the use of inexpensive and easily processed elements and/or materials. As a result, the components are moreover particularly simple to process and install.

In addition, the component can be used for insulating complex geometries. The component in this connection does not lead to long cycle times when employed in mass manufacture.

In addition, the components of the present invention and the vacuum insulation systems obtainable therefrom provide high insulating performance combined with high flexibility at installation and also high robustness in handling and operating. Further, the breadth of possible uses for the vacuum insulation systems is advantageous in that they can more particularly be used in very broad temperature ranges without the insulating performance being reduced.

These advantages can be utilized in all previously outlined fields of application, frequently with synergistic benefits. In the field of district heating, process steam and other heat transfer media systems, the vacuum insulation systems obtainable through the present components offer insulating properties otherwise at best only available from good conventional vacuum insulation systems, coupled with low manufacturing costs, very simple and flexible installation and also good handlability on the building site. The good insulating properties make it possible to achieve distinctly longer distances economically than from the use of conventional insulation systems, which creates additional possible uses. It is also possible to use insulating materials that permit distinctly higher operating temperatures than the common PU foams (about 110° C. sustained temperature). This makes it possible in principle to transport heat at a higher temperature level and/or with a larger temperature difference between outward and return legs. The latter makes it possible to reduce the mass flow and/or the line cross sections (and this under certain circumstances also permits a reduction in the heat exchanger systems used for extracting useful energy) and hence a further reduction in capital costs.

The vacuum insulation systems of the present invention which are used for insulating buildings make it possible to achieve significant reductions in the heating energy requirements of new as well as existing buildings without major architectural constraints and without appreciably increasing building costs.

With regard to the transportation of hot tap water as well as heating water through pipework lines in buildings the present invention makes it possible to produce inexpensive, flexible, easily installed pipework or hose lines having small outside diameters, which nonetheless, in operation, perform at vacuum insulation parameters hitherto not realizable for cost reasons. Using lines insulated according to the present invention achieves a noticeable reduction in the heating energy requirements of buildings.

Reactors and apparatuses as used in industry in particular profit from the present invention because it represents an ideal combination of the advantages of traditional fibrous mat insulation in respect of processability, flexibility and price with the insulating properties of vacuum insulation. Using high-performance polymeric fibers of the present invention makes it possible to achieve sustained operation temperatures of up to around 270° C., and the use of glass/rock wool fibers or other ceramic fibers and/or powders instead of the high-performance polymeric fibers makes it possible to achieve even distinctly higher temperatures. Heating energy requirements in industry can thus be significantly reduced.

A further interesting application is in relation to PCM stores (PCM=phase change material: materials capable through a phase transition of taking up appreciable amounts of latent heat and of releasing it again later in the reverse process). This represents an alternative to district/local heating grids, transporting heat in mobile containers. Such containers naturally require an inexpensive, highly effective, lightweight and compact-building thermal insulation of the kind represented by the insulation systems of the present invention.

The present invention makes it possible to achieve significant reduction in the cooling energy requirements of cold stores without major architectural constraints and without appreciably increasing building costs. The maximum storage time of refrigerated goods in transportation packaging or containers (e.g., food tankers, refrigerated trucks or wagons, frozen goods transporters) can be appreciably increased, and/or the energy requirements to compensate unwanted heat inputs can decrease significantly. This also means a reduction in the noise and exhaust gas nuisance hitherto emanating from parked refrigerated vehicles and containers.

Synergistic effects are achievable through the present invention particularly also in relation to the insulation of means of transport, more particularly aircraft. Porous insulating materials can be stored in a conventional manner in void spaces between the outer casing and the inner wall of the cabin. The present invention makes it possible to convert this insulation into a vacuum insulation where a large proportion of the casing which encloses the insulation layer can be formed from the structural components of the means of transport. Accordingly, the manufacturing costs of these kinds of insulation are very low compared with the use of conventional vacuum insulation systems.

A further advantage of the insulation embodied according to the present invention for aircraft and lightweight construction is the possibility of consolidating the insulating material to bring about a stiffening of the overall structure. This can be effected for example through a multiplicity of mutually gastightly sealed small cells, filled with fibers and/or powders, by means of the requisite dividing walls which connect the outer and inner walls of the exterior casing components to each other. This leads to a mechanically very stiff or self-supporting structure similar to a conventional VIP. Unlike VIPs, however, it is possible to produce very complex three-dimensional constructions since the production of the vacuum is only initiated after accurate installation and gastight sealing of the assembly. Moreover, a sufficient number of individual mutually gastight vacuum cells will ensure even in the event of local damage to the overall structure a continuing high mechanical integrity, unlike the case with typical large-area VIPs in the event of injury to the gastight casing.

The invention relates to a component for producing vacuum insulation systems. The term component is to be understood for the purposes of the present invention as meaning an article which is suitable alone or together with further similar or different articles for producing a vacuum insulation system. The term vacuum insulation system is to be understood in the context of the present invention as referring to any article which contains regions comprising void spaces wherein the void spaces have a gas pressure which is appreciably reduced relative to normal atmospheric pressure and which thereby is suitable for reducing the outflow or inflow of thermal energy. These include more particularly the previously outlined line systems through which cold fluids, for example hydrogen in liquid or gaseous form, are ducted, or district heating lines through which hot fluids are transported. Further included are insulation systems used in buildings, cooling systems, apparatuses, household appliances and the like.

The component comprises at least one casing which encloses an insulation layer. The casing serves to maintain a vacuum formed in the insulation layer after activation of the means for reducing the gas pressure. Accordingly, the casing acts as a gas barrier layer which should have a very low gas permeability.

It is known that gastightness is dependent on the gas which can diffuse through a layer. Gas diffusion is further dependent on the type and thickness of the casing material. Gastightness here should be as high as possible without the processability and the cost of the casing material increasing unacceptably. Furthermore, the pressure increase due to diffusion of a gas is dependent on the area through which the gas can diffuse. The degree of tightness is further dependent on the intended service life of the system in which the present component is used.

Preferably, the previously outlined parameters, for example the thickness of the casing material and also the type of the casing material as a function of the ratio of casing material surface to encased volume, are chosen such that the gas pressure which develops after activation of means for reducing the gas pressure rises by at most 20 mbar, preferably at most 10 mbar and more preferably at most 2 mbar in one year. This gas pressure refers to the overall pressure, this value being measured under normal conditions (1013 mbar, 20° C.) with air as external medium.

The casing of the component may already have an appropriate gastightness at the time of delivery for example. The casing may further be rendered gastight only as the component is being installed. Accordingly, the term "gastightness" relates to the installed state of the component.

In the case of line systems, for example, the casing may comprise one or more shell layers and one or more sealing layers, formed by fluid-ducting lines for example. In this case, the insulation layers, the shell layers and also the inner sealing layers can be assembled from different components in order that a line system may be formed for example.

In the case of equipment or apparatuses, for example refrigerators or deep-freezers, for example, the inner or outer lining may form part of the casing of the component of the present invention.

Materials from which the casing can be formed are known per se, reference being made in this connection to the previously outlined printed publications. In many cases, the choice of the suitable material is dependent on the planned purpose of the component. Particularly metals and plastics can thus be used to fabricate the casing.

Surprising advantages are achievable for example by means of polymeric foils, of which at least part of the casing can be formed. These polymeric foils preferably have a water vapor transmission rate of not more than 0.05, more preferably not more than 0.005 and most preferably not more than 0.001 g/(m$^2$.d) at 23° C. and 85% relative humidity. Transmission rates in relation to other gases ($O_2$, $N_2$, $CO_2$ for example) are collectively preferably not greater than 0.5 and more preferably not greater than 0.1 cm$^3$/(m$^2$.d.bar) at 23° C. The lower limits result particularly from the service lives of the components and also the technical circumstances. Thus, values of less than 0.0001 g/(m$^2$.d) for the water vapor transmission rate and of less than 0.01 cm$^3$/(m$^2$.d.bar) for the transmission rates of other gases are under the previously outlined conditions achieved only with great difficulty or with the assistance of additional metal-containing layers. Therefore, the water vapor transmission rate is preferably in the range from 0.0001 to 0.08 and more preferably in the range from 0.0002 to 0.05 g/(m$^2$.d) at 23° C. and 85% relative humidity. The transmission rates in respect of other gases ($O_2$, $N_2$, $CO_2$ for example) are collectively preferably in the range from 0.01 to 0.1 and more preferably 0.03 to 0.05 cm$^3$/(m$^2$.d.bar) at 23° C.

Foils which will prove particularly effective have a multilayered construction such that gas barriers on the top and bottom sides are connected to a highly effective water vapor blocker via layers of adhesive.

Such a casing can take the form of a multilayered foil which comprises a blocking layer and includes the following layers:

A) a protective lacquer layer composed of PVDC and optionally including a polyvinyl alcohol layer,
B1) optionally a connecting or adhesive layer,
C1) a polyolefin layer,
B2) a connecting or adhesive layer,
D) an ethylene-vinyl alcohol copolymer layer optionally provided on one side at least with a polyamide layer E by coextrusion,
B3) optionally a connecting or adhesive layer,
C2) a polyolefin layer.

Foils having this construction are particularly outlined in EP-A-0 446 486, filed Dec. 28, 1990 with the European Patent Office under application number 90125659, U.S. Pat. No. 5,389,420 filed Nov. 30, 1992 with the United States Patent and Trademark Office (USPTO) under application Ser. No. 983,216 and U.S. Pat. No. 5,236,758 filed May 15, 1991 with the United States Patent and Trademark Office (USPTO) under application Ser. No. 669,738, these printed publications being cited for disclosure purposes and the foils disclosed therein being incorporated in this application.

Depending on the use of the present component, it can be advantageous to minimize the thermal conductivity parallel to the casing. In a particular aspect of the present invention, the casing preferably does not include a metal layer which might lead to heat conduction. Accordingly, the casing material may preferably be formed to be metal free. This embodification can be advantageous particularly for line systems transporting cold fluids.

On the other hand, embodifications requiring a particularly low gas permeability are also advantageous, this particularly low gas permeability being achievable through the use of metals in the casing material. These embodifications can be sensible particularly in the case of line systems conducting warm fluids, for example district heating lines or hotwater lines in buildings, or in the case of apparatuses in which heat is stored.

A vacuum insulation system obtainable through a component according to the present invention may include at least one thermally insulated region. Accordingly, the component of the present invention is engineered such that this thermally insulated region can form. By "thermally insulated region" in the context of the present invention is meant a volume which can be filled with a hot or cold matter or through which a hot or cold fluid can be conducted, the substance present in this volume being insulated against heat transfer, i.e., the substance is subject within this region to a reduced change in temperature.

A component according to the present invention further includes at least one insulation layer. The insulation layer serves to reduce heat transfer between the environment and the thermally insulated region.

Since heat transfer is reduced by a pressure reduction within the thermal insulation layer, this layer has to have sufficient mechanical stability to prevent any collapsing of the space within the casing unless this mechanical stability is not already ensured by an adequately mechanically stable casing around the insulation layer. Typically, the insulation layer comprises fibers, foams or particles (silica powders for example), or combinations of the aforementioned classes of matter, which provide a certain mechanical stability through their microstructure alone. This ensures a volume within which a low pressure can prevail, and so a low thermal conductivity can be achieved. This volume can also be referred to or regarded as pore volume.

The preferred materials for producing the insulation layer include more particularly finely divided silicon dioxide particles, for example precipitated silica, fumed silicas and also aerogels. These materials can be used singly or mixed with each other or mixed with further materials (in the form of fibers or fiber assemblies for example). In addition, the insulation layer may comprise customary additives, for example carbon black or other IR absorbers.

Materials for producing the insulation layer are outlined particularly in EP-A-0 446 486, filed Dec. 28, 1990 with the European Patent Office under application number 90125659, U.S. Pat. No. 5,389,420 filed Nov. 30, 1992 with the United States Patent and Trademark Office (USPTO) under application Ser. No. 983,216 and U.S. Pat. No. 5,236,758 filed May 15, 1991 with the United States Patent and Trademark Office (USPTO) under application Ser. No. 669,738, these printed publications being cited for disclosure purposes and the materials disclosed therein for producing the insulation layer being incorporated in this application. Aerogels to be used with preference are described for example in the printed publications WO 2007/044341 A2, WO 02/052086 A2 and WO 98/13135.

In a particular aspect of the present invention, the insulation layer may comprise a fiber assembly. A fiber assembly to be used with preference comprises high-performance polymeric fibers and bonding fibers. High-performance polymeric fibers are known to those skilled in the art. The term is to be understood as meaning more particularly polymeric fibers which can be used at high temperatures. The polymeric materials comprising these fibers preferably have low solid-state thermal conductivities, are very elastic and hard, chemical resistant, of low flammability, and have a relatively high IR extinction coefficient.

The high-performance polymeric fibers preferably have a melting point or a glass transition temperature of at least 200° C. and more preferably at least 230° C. This property can be measured by means of differential scanning calorimetry (DSC).

The solid-state thermal conductivity of preferred polymeric materials for producing high-performance polymeric fibers is preferably at most 0.7 W/(mK), more preferably at most 0.2 W/(mK), for example measured as per ASTM 5930-97 or DIN 52616 at a temperature of 293 K.

Preferred high-performance polymeric fibers include inter alia polyimide fibers, polybenzimidazole fibers, polyaramid fibers, polyether ketone fibers and/or polyphenylene sulfide fibers, of which polyimide fibers are particularly preferred.

Polyimides are known per se and described for example in Ullmann's Encyclopedia of Industrial Chemistry 5th edition on CD-ROM.

Polyimides may preferably have a weight average molecular weight in the range from 25 000 to 500 000 g/mol.

In addition to homopolymers, useful polyimides further include copolymers which, in addition to the imide building blocks, comprise further functional groups in the main chain. It is a particular aspect of the present invention that the polyimides can be at least 50% by weight, preferably at least 70% by weight and even more preferably at least 90% by weight derived from monomeric building blocks leading to polyimides.

Particularly preferred polyimides are commercially available under the trade name P84 from Evonik Fibres GmbH, Lenzing/Austria or from HP-Polymer GmbH, Lenzing/Austria and under the name Matrimid from Huntsman Advanced Materials GmbH/Bergkamen.

In a preferred embodiment, the high-performance polymeric fibers may have a non-circular cross-sectional shape. Non-circular cross-sectional shapes generally have bulges and indentations. A bulge is a bounding of the fiber in the transverse direction at a maximum distance from the fiber's center of gravity, while an indentation is a bounding of the fiber at a minimum distance from the fiber's center of gravity. The bulges and indentations are accordingly local maxima and minima, respectively, of the separation of outer bounding of the fiber and the fiber's center of gravity. The largest distance from the center of gravity of the fiber to at least one of the bulges can be regarded as outer radius of the fiber's cross section. It is similarly possible to define an inner radius as the minimum distance between the center of gravity of the fiber and at least one indentation. The ratio of outer radius to inner radius is preferably at least 1.2, more preferably at least 1.5 and even more preferably at least 2. The cross-sectional shape of the fibers and also the extent can be determined via electron microscopy.

These non-circular cross-sectional shapes include more particularly multilobal cross sections and star-shaped cross sections which have three, four, five, six or more bulges. It is particularly preferred for the fiber to have a trilobal cross section. Polyimide fibers having a non-circular cross section, more particularly a trilobal cross section, are obtainable in particular by using a solution having a relatively low polymer content in the customary solution spinning processes.

Hollow fibers can be used as well as solid fibers. Preferred hollow fibers likewise have a non-circular cross-sectional shape, more particularly a trilobal cross-sectional shape.

The high-performance fibers can be used as staple fiber or as continuous filament.

The diameter of the high-performance polymeric fibers is preferably in the range from 1 to 50 µm, more preferably in the range from 2 to 25 µm and even more preferably in the range from 3 to 15 µm. The diameter here refers to the maximum extent of the fiber in the transverse direction which is measured through the center of gravity. The diameter can be determined inter alia using electron microscopy (SEM).

The linear density of the high-performance polymeric fibers may preferably be at most 10 dtex and more preferably at most 5 dtex. The linear density of the high-performance polymeric fibers is preferably in the range from 0.05 to 4 dtex and more preferably in the range from 0.1 to 1 dtex, measured at the maximum extent. Fiber linear density can be measured in accordance with the standard DIN EN ISO 1973.

It is a particular aspect of the present invention that it is possible to use high-performance fibers having a crimp. The crimp may preferably be in the range from 1 to 50 and more preferably in the range from 3 to 10 per cm. Fiber crimp can be determined via optical methods. These values frequently result from manufacture.

A further preferred embodiment may utilize high-performance fibers having only minimal if any crimp.

In addition to high-performance polymeric fibers, a fiber assembly, which is used for preference, may comprise bonding fibers, used to bond the high-performance polymeric fibers together. The bonding fibers preferably have a melting point or a glass transition temperature of at most 180° C. and more preferably of at most 150° C. The melting point or the glass transition temperature can be determined via DSC.

The bonding fibers preferably comprise polyolefin fibers, acrylic fibers, polyacetate fibers, polyester fibers and/or polyamide fibers.

The diameter of the bonding fibers is preferably in the range from 1 to 50 μm, more preferably in the range from 2 to 20 μm and even more preferably in the range from 4 to 10 μm. Diameter here refers to the maximum extent of the fiber in the transverse direction measured through the center of gravity.

The linear density of preferred bonding fibers is preferably less than 10 dtex, more preferably less than 5 dtex. The linear density of preferred bonding fibers is preferably in the range from 0.05 to 4 dtex and more preferably in the range from 0.1 to 2 dtex, measured at the maximum extent.

The fiber assembly may preferably comprise at least 70% by weight of high-performance polymeric fibers and at most 30% by weight of bonding fibers. The proportion of high-performance polymeric fibers is preferably in the range from 75% by weight to 99.5% by weight and more preferably in the range from 80 to 95% by weight. The upper limit to the proportion of bonding fibers results from the required performance capability on the part of the fiber assembly, while the lower limit results from the requirements dictated by the manufacturing methods of the insulation systems. The proportion of bonding fibers is preferably in the range from 0.5% by weight to 25% by weight and more preferably in the range from 5% by weight to 20% by weight.

The fiber assembly may preferably have a layered arrangement of the fibers, at least some of the fibers being bonded together by points of contact obtainable by softening of the bonding fibers.

The term "layered arrangement of the fibers" is to be understood as meaning that the fibers have at least one main orientation which is essentially in a plane. Here the term "plane" is to be understood as having a wide meaning, since the fibers have a three-dimensional extent and the plane can also be curved. The term "essentially" is accordingly to be understood as meaning that the main orientation of the fibers is such that a very low proportion of the fibers is oriented in the direction of a heat gradient. The main orientation results from the direction of the fibers which is averaged along the length of the fiber, minor directional changes being disregardable.

A layered arrangement within this meaning is generally achieved in the production of webs or batts. In these processes, filaments or staple fibers are arranged in a plane and subsequently consolidated. This can be effected for example by air-laid processes or by wet-laid processes. Preferably, only a few fibers have a main orientation perpendicular to this plane. Accordingly, the fiber assembly is generally not consolidated by marked needling.

The fiber assembly is obtained by softening and subsequent cooling of the bonding fibers. Processes relating thereto are described more particularly in the U.S. Pat. Nos. 4,588,635, 4,681,789, 4,992,327 and 5,043,207 patents to Albany International Corp., Albany, N.Y. (USA). The temperature depends more particularly on the softening temperature (glass transition temperature or melting temperature) of the bonding fibers. It is frequently not necessary here for all fibers to be bonded together by points of contact obtainable by softening of the bonding fibers. The higher this proportion, the better the mechanical properties possessed by the assembly. However, the thermal conductivity of the assembly may increase. It may be mentioned in this connection that the fibers in the assembly may also have points of contact which were not obtained by softening of the bonding fibers. These include more particularly points at which the high-performance polymeric fibers touch.

Within a plane of the layered arrangement, the fibers may preferably have precisely one main orientation, in which case the main orientation of fibers of different planes more preferably form an angle with each other. The expression "main orientation of the fiber" results from the average orientation of the individual fiber over its total length. The angle which the oriented fibers of different planes can have relative to each other is preferably in the range from 5° to 175° and more preferably in the range from 60° to 120°. The main orientation of the fibers and also the angles of the fibers of different planes relative to each other can be determined via optical methods. Frequently, these values result from manufacture in that the orientation of fibers can be predetermined by carding and/or cross lapping for example.

A low density is frequently associated with a particularly low thermal conductivity on the part of the fiber assembly. On the other hand, the strength of the fiber assembly decreases as a result of low density, so that stability can frequently become too low to offer sufficient support to a line conducting the hot or cold fluid. It is therefore a surprising advantage for a fiber assembly according to the present invention, used in an insulating material for example, to preferably have a density in the range from 50 to 300 kg/m$^3$, more preferably 100 to 150 kg/m$^3$, these values being measured under a load dictated by the processing and the incorporation into the insulating material. This load transversely to the plane of the main orientation of fibers to which these density values apply is for example in the range from 1 mbar to 1000 mbar, these density values being measurable for example at a load of 1 mbar, 10 mbar, 50 mbar, 100 mbar, 200 mbar, 400 mbar, 600 mbar, 800 mbar or 1000 mbar.

In the unloaded state, more particularly prior to processing, the fiber assembly can preferably have a density in the range from 1 to 30 kg/m$^3$ and more preferably 5 to 20 kg/m$^3$, in which case this density can be measured at a thickness for the unprocessed fiber assembly which is not more than 5 cm.

The average thermal conductivity of a fiber assembly according to the present invention when measured perpendicularly to the planes of the layered arrangement is preferably at most $10.0*10^{-3}$ W(mK)$^{-1}$, more preferably at most 5.0 mW(mK)$^{-1}$ and even more preferably at most $1.0*10^{-3}$ W(mK)$^{-1}$. The measurement can be carried out for example at room temperature (293 K) and/or at low temperatures, for example 150 K or 77 K, in which case the material withstands a load under these conditions for at least 14 days. The test is preferably carried out at a low absolute pressure, for example at a pressure of 1 mbar or less as per DIN EN 12667 ("Determination of thermal resistance by means of guarded hot plate and heat flow meter methods—products of high and medium thermal resistance"). The determination can be carried out for example at a gas pressure of 0.01 mbar within the fiber assembly to be measured and at a confining pressure of 70 mbar exerted by the measuring apparatus on the fiber assembly to be measured transversely to the plane of the main orientation of the fibers.

The thermal conductivity values recited above are achievable more particularly because there is only minimal heat transfer perpendicularly to the fiber plane of the layered arrangement. Therefore, it is preferable to dispense with any marked needling or with any consolidation using a high amount of liquid binders which can lead to heat or cold bridges perpendicularly to the layered arrangement of fiber. However, minimal needling or the use of minimal amounts of liquid binders is possible provided these measures only lead to a minimal increase in thermal conductivity.

It is particularly preferable that a fiber assembly according to the present invention has high stability including in the direction perpendicularly to the plane of the main orientation of the fibers. A fiber assembly according to the present invention thus has in the processed state and/or in the insulating material a relatively low compressibility which is preferably at most 50% when the load increases by 1 mbar; that is, when the load increases by 1 mbar, the thickness of the fiber assembly decreases by at most 50%, preferably by at most 30%, more preferably by at most 10% and even more preferably by at most 5%, based on the original thickness of the processed assembly.

Components or vacuum insulation systems within the meaning of the above observations are described inter alia in DE-A-36 30 399, EP-A-0 949 444, U.S. Pat. No. 4,924,679, DE-A-100 31 491, DE 692 02 950 T2, DE 195 11 383 A1, DE 196 41 647 C1, DE 695 19 354 T2, DE-A-20 13 983, WO 2005/043028, EP-A-0 618 065, EP-A-0 446 486, EP-A-0 396 961 and EP-A-0 355 294. In these systems, however, the vacuum is generated in a conventional manner, for example via pumps.

A component in accordance with the present invention, unlike the above-described systems, is constructed such that the gas pressure in the insulation layer can be reduced by a means which is provided in the component and which is embodied as activatable.

The means for reducing the gas pressure accordingly comprises one or more substances capable of bringing about events which lead to the number of moles of the atoms or molecules present in the gas phase being reduced. These substances are herein also referred to as active substances.

Specific embodifications of the means for reducing the gas pressure and of the active substances are dependent on the nature of the gas present in the insulation layer before activation of said means. Preferably, the means for reducing the gas pressure is capable of absorbing, adsorbing and or chemically reacting with a gas in the insulation layer.

Gases which can be present in the insulation layer before activation of the means for reducing the gas pressure preferably include inter alia basic gases, for example $NH_3$; acidic gases, for example carbon dioxide, HCl, $SO_2$, $SO_3$; gaseous oxidizing agents, for example oxygen; hydrogen and/or addition-polymerizable gases, for example ethylene and/or propylene. The number of particles of these gases present in the gas phase is simple to reduce by absorption, adsorption or chemical reaction.

An acidic gas, preferably carbon dioxide, which at standard conditions, i.e., 20° C. and 1013 mbar, can be initially present in gaseous form in the insulation layer of the component can react preferentially with a basic substance. Accordingly, the means for reducing the gas pressure may comprise as active substance a basic substance capable of absorbing or adsorbing carbon dioxide. Basic substances capable of reacting with carbon dioxide to form carbonates or bicarbonates for example are oxides and hydroxides, which are preferably formed by alkali and/or alkaline earth metals. Specific embodiments include NaOH, KOH, $Na_2O$, $K_2O$, CaO, $Ca(OH)_2$, MgO and/or $Mg(OH)_2$. It is further possible to use amines which are at room temperature liquid or solid for absorbing or adsorbing an acidic gas, more particularly carbon dioxide, $SO_2$, $SO_3$ or HCl. In respect of the aforementioned amines it is also possible to use more particularly anion exchangers in the $OH^-$ form, and also polymers comprising amino groups. These compounds can be used singly or as mixtures comprising two or more components.

The molar ratio of acidic gas, preferably carbon dioxide, to basic substance, preferably NaOH, KOH, $Na_2O$, $K_2O$, CaO, $Ca(OH)_2$, MgO and/or $Mg(OH)_2$, can vary within wide limits. To achieve a particularly low gas pressure after activation of the means for reducing the gas pressure it is possible to use a large excess of basic substance. Accordingly, the molar ratio of acidic gas, preferably carbon dioxide, to basic substance, preferably NaOH, KOH, $Na_2O$, $K_2O$, CaO, $Ca(OH)_2$, MgO and/or $Mg(OH)_2$, can be in the range from 1:1 to 1:100, more preferably in the range from 1:2 to 1:10 and more preferably in the range from 1:3 to 1:5.

Special advantages are surprisingly shown by active substances, more particularly basic active substances, such as NaOH, KOH, $Na_2O$, $K_2O$, CaO, $Ca(OH)_2$, MgO and/or $Mg(OH)_2$, on a carrier material. It is thus possible to use preferably inorganic porous carrier materials, for example oxides of aluminum and/or of silicon. Such carriers are disclosed inter alia in CA-A-2438438. It is preferable to use molecular sieves, for example silicoaluminophosphates, active alumina, kieselguhr, zeolites and/or silica gels as inorganic carriers. These materials are described inter alia in Römpp Chemie Lexikon 2nd edition on CD-ROM and are commercially available from Evonik Degussa GmbH. This embodification surprisingly achieves a very high reduction in pressure for relatively little basic active substance. These systems further show very good controllability for the evolution of heat which may occur with the reduction in pressure.

The unladen inorganic and/or organic porous carrier material preferably has a DBP absorption (in accordance with DIN 53601; DBP: dibutyl phthalate) of at least 180 g/100 g. The pores accessible to DBP are also accessible to the active substance and the optionally used materials of a protective system, herein also called casing substance, hence a high DBP is important to achieve a high loading of the pores of the carrier with active substance and protective matter or pores. Thus, too low a DBP absorption can be ineffective depending on the active substance since too much carrier material has to be used. The DBP absorption of the carrier material is preferably in the range from 180 to 600 g/(100 g), more preferably in the range from 180 to 500 g/(100 g), even more preferably in the range from 200 to 500 g/(100 g) and yet even more preferably in the range from 240 to 500 g/(100 g), yet still even more preferably in the range from 240 to 400 g/(100 g) and specifically preferably in the range from 240 to 350 g/(100 g).

Supported active substances are obtainable for example by the active substance being dissolved in a suitable solvent, for example alcohol or water, and introduced in a conventional manner into the porous carrier. The amount of solution here can be chosen such that the porous carrier can take up the entire solution, so that initially a flowable powder may be obtained as intermediate product. In a further step, the intermediate product thus obtained is dried to remove the solvent from the porous carrier. After the drying step, the previously outlined steps of introducing and drying can be repeated to increase the degree of loading of the system, i.e., to increase the proportion of active substance.

The mixing intensities and the metering in the process can be coordinated with each other in a preferred embodiment such that flowability is ensured at the end of the introducing step, i.e., a flowable powder is at all times present in the mixer. This surprisingly has the effect of ensuring that the casing or active substance is completely absorbed in the pores and does not adhere to the external carrier surface. When metering is too fast or mixing is not intensive enough, the particles may end up becoming unevenly loaded, which can finally lead to the pores of some particles being completely filled with active substance and casing substance no longer being able to get in. It should also be noted in this connection that the stirring implements, for example IKA Duplex mixing implement in the H60 measuring kneader, are chosen such that there is only minimal abrasion due to shearing stress. Abrasion of the particles is checked by measuring the particle size distribution. To this end, the carrier materials are initially charged to a mixing unit used later and the mixing operation is started in accordance with the later procedure. Following a defined mixing time, samples are taken and the particle size distribution is determined. The particle size distribution should not show a more than 5% deviation from the $d_{50}$ value of the starting sample.

Surprising advantages are achievable more particularly by means of supported active substances where the weight ratio of active substance to carrier is in the range from 100:1 to 1:10 and more preferably in the range from 10:1 to 1:1.

Surprisingly, the gas pressure can be minimized to particularly low values when the abovementioned amines, oxides and/or hydroxides are used in combination with driers, for example zeolites, molecular sieves, hydrophilic silicas (e.g., dried Aerosil® products from Evonik Degussa GmbH), and other known driers such as $P_2O_5$, calcium oxide (CaO), calcium chloride ($CaCl_2$), lithium bromide (LiBr) and superabsorbents (polymers having very polar side groups, for example Favor® from Evonik Stockhausen GmbH) in dried form.

The weight ratio of basic substance to drier can preferably be in the range from 1:10 to 100:1 and more preferably in the range from 1:2 to 10:1. In a further embodiment of the present invention, the weight ratio of basic substance to drier can preferably be between 1:100 and 20:1 and more preferably between 1:10 and 2:1.

In a particular embodiment of the present invention, the drier may be provided in a relatively cold region within the casing of the component. Accordingly, the drier can be applied at a location, within or outside the insulation layer, that is at a temperature which is less than the arithmetic mean formed by the temperature maximum and the temperature minimum.

A basic gas, more particularly ammonia, may be reacted for example with a solid or liquid acid, more particularly a solid ion exchanger in protonated form as active substance.

It is a particular aspect that an oxidizing gas, for example oxygen, can be simply reacted by means of suitable solid or liquid reducing agents, for example finely divided and hence pyrophoric metals (e.g., pyrophoric iron), semimetals (e.g., pyrophoric silicon) and other pyrophoric materials provided as active substance, to remove them from the gas phase.

In a further embodiment, the insulation layer may contain hydrogen which, after activation of the means for reducing the gas pressure, can be removed from the gas phase of the insulation layer. In this embodiment, the means for reducing the gas pressure may comprise as active substance a metal and/or an alloy capable of adsorbing or absorbing hydrogen. Preferred embodiments of this variant are disclosed for example in EP 347 367, for which the EP-0 347 367 A1 document filed Jan. 06, 1989 with the European Patent Office under application number 89730135.4 is incorporated herein by reference for the hydrogen-absorbing compounds disclosed therein. Suitable metals and/or metal alloys comprise for example vanadium, iron, aluminum, titanium and/or nickel.

It is additionally possible for polar gases, for example $CO_2$, $NH_3$, $SO_2$, NO, CO, to be absorbed by ionic liquids which are preferably immobilized on porous carriers. Ionic liquids can be supplied and optimally tuned with regard to absorption equilibria by Solvent Innovation of Cologne, for example, while suitable carriers can be silicas (for example Aerosil® and Sipernat® products from Evonik Degussa GmbH) and also hydrophilic alumina products (from various manufacturers).

A further embodiment utilizes water or some other room temperature liquid compound that is easy to vaporize, for example methanol or ethanol. In this case, these compounds can be vaporized before the activation mechanism is triggered, in which case the gas formed, for example, water vapor or methanol gas, displaces the other gases. In this case too, a mechanical vacuum can be applied by pumping. After displacement of other gases, the system can be sealed, whereupon the means for reducing the gas pressure can be activated. The means for reducing the gas pressure can be realized in this specific form in the form of driers which after activation, for example by breaking open an encapsulated seal absorb the vapor present in the insulation layer, achieving a reduction in the gas pressure in the insulation layer.

Preferred driers include inter alia zeolites, molecular sieves, hydrophilic silicas (for example dried Aerosil® products from Evonik Degussa GmbH) and other known driers such as $P_2O_5$, calcium oxide (CaO), calcium chloride ($CaCl_2$), lithium bromide (LiBr) and superabsorbents (polymers having very polar side groups, for example Favor® from Evonik Stockhausen GmbH) in dried form, etc. The means for reducing the gas pressure, more particularly the drier, may as previously described be provided in a relatively cold region within the casing of the component in order that an optimal absorption performance may be achieved. This embodiment is advantageous for all embodifications in which the ad- or absorption performance of the active substance is highly temperature dependent within the envisioned range of the service temperature of the vacuum insulation system.

The insulation layer may in addition contain initially one or more addition-polymerizable compounds which are gaseous at standard conditions. These include propylene and/or ethylene for example. The addition-polymerizable compound can be converted into a solid or liquid substance by an addition-polymerization reaction. In this further modification of the invention, the means for reducing the gas pressure may comprise as active substance one or more addition polymerization catalysts and/or addition polymerization initiators.

Suitable addition polymerization initiators are for example compounds that form free radicals. Useful initiators include inter alia the widely familiar azo initiators, such as AIBN and 1,1-azobis-cyclohexanecarbonitrile, and also peroxy compounds, such as methyl ethyl ketone peroxide, acetylacetone peroxide, dilauryl peroxide, tert-butyl per-2-ethylhexanoate, ketone peroxide, tert-butyl peroctanonate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis (tert-butylperoxy)cyclohexane, 1,1-bis(tert-butyl-peroxy)-3, 3,5-trimethylcyclohexane, cumyl hydroperoxide, tert-butyl hydroperoxide, bis(4-tert-butylcyclohexyl)peroxydicarbonate, mixtures of two or more of the aforementioned compounds with each other and also mixtures of the aforementioned compounds with compounds not mentioned which are likewise capable of forming free radicals.

Examples of suitable addition polymerization catalysts include Ziegler-Natta catalysts or metallocene catalysts, which are outlined inter alia in Ullmanns' Encyclopedia of Industrial Chemistry, Sixth Edition.

Of particular interest are in particular active substances or means for reducing the gas pressure which are in particulate form. These particles preferably have a diameter in the range from 1 µm to 10 mm, more preferably in the range from 10 µm to 5 mm and more preferably in the range from 0.1 mm to 3 mm. These values relate to the $d_{50}$ value (50% of the particles are smaller, 50% are larger) and can be determined by microscopic methods.

Before activation of the means for reducing the gas pressure the gas in the insulation layer can be at least partially removed by pumping. In a preferred embodiment of the present invention, the means for reducing the gas pressure is embodied such that a relatively high gas pressure can be reduced to very low values solely by the mechanisms described herein without any need to use mechanical pumps. This embodification can inter alia be achieved by the amount of active substance used, based on the amount of gas in the insulation layer. As a result, there is no need for mechanical pumping which is associated with high energy requirements. It is further possible inter alia to avoid mistakes when taking the vacuum insulation system into operation.

According to this particular aspect of the present invention, the gas pressure in the insulation layer prior to activation of the means for reducing the gas pressure is at least 500 mbar, more preferably at least 800 mbar and even more preferably at least 950 mbar.

This gas pressure is essentially due to the gas which is present in the insulation layer and which is absorbed and/or adsorbed by means for reducing the gas pressure and/or reacts therewith, so that a very low gas pressure can be achieved after activation. In a particular embodiment of the present invention, the gas in the insulation layer may include at least 80% by volume, more preferably at least 90% by volume and even more preferably at least 95% by volume of carbon dioxide. Of particular interest here are particularly embodiments wherein the gas in the insulation layer includes at least 98% by volume, more preferably at least 99% by volume and even more preferably at least 99.5% by volume of carbon dioxide.

By using a reactive gas, preferably an acidic gas, more particularly carbon dioxide in the insulation layer of the component it is surprisingly possible to provide a system whereby a vacuum can be produced in an inexpensive and safe manner without mechanical pumps having to be used. Furthermore, this system can be stored for a long period without special precautions having to be taken. In addition, the vacuum insulation system can be taken into operation in a particularly simple and safe way without costly and inconvenient safety precautions having to be taken.

Preferably, the means for reducing the gas pressure is able to lower the initial pressure in the insulation layer to values of not more than 500 mbar, more preferably of not more than 50 mbar, specifically of not more than 10 mbar and most preferably of not more than 1 mbar. This substantially reduces the thermal conductivity of the system. These values can be achieved by the type and amount of the means for reducing the gas pressure.

In accordance with a particular aspect of the present invention, the speed of these events which lead to a reduction in the number of moles of the molecules present in the gas phase can be controlled, and so local overheating can be avoided. For example, the means for reducing the gas pressure can be present in finely divided form throughout the component, so that any heat of reaction is produced spread out through a large volume. In addition, it is also possible to provide a dividing layer which although gas-permeable to a certain degree, depending on the particular reaction, limits the direct contact between the gas and the means for reducing the gas pressure.

According to the present invention, the means for reducing the gas pressure is embodified as activatable. Here "embodified as activatable" is to be understood in the context of the invention as meaning that the means for reducing the gas pressure will reduce the gas pressure which initially exists in the insulation layer only after an activation mechanism has been triggered. The activation mechanism can be distinguished from the event which leads to the gas pressure being reduced. The activation mechanism is triggered by one or more actions which take place after the gastight sealing of the casing surrounding the insulation layer. The resulting decoupling of activation from the event which leads to the gas pressure being reduced does away with the need for a sustained action for keeping the gas pressure low. The action used to trigger the activation mechanism, or reduce the gas pressure, accordingly does not have to be sustained but need not take place after the activation, which is later completed with the reaching of the envisioned evaluation pressure, without the gas pressure rising significantly. This decoupling, which appears after activation in particular, is not described in the prior art. Accordingly, the actions used to reduce the gas pressure which take place according to the prior art must in contrast thereto be maintained for the period for which the vacuum is to be maintained. Preferably, the contemplated activation mechanism of the means for reducing the gas pressure is accordingly irreversible. In the process described in EP 347 367, this action consists in maintaining the article at room temperature. On heating to the temperature at which the article was sealed, the system displays distinctly elevated pressure, generally atmospheric pressure, so that the insulating effect decreases. One disadvantage here is the high temperature needed to maintain a vacuum on cooling. Events which, according to the prior art, rely on freezing out require a fluid which is passed through the line at low temperatures. Otherwise, no reduction in the gas pressure is achieved.

The means for reducing the gas pressure can be activatable mechanically, chemically, electrically, thermally and/or by irradiation with electromagnetic waves, for example. In other words, mechanical, chemical, electrical and/or thermal action and/or irradiation with electromagnetic waves can trigger an event which leads to a reduced gas pressure in the insulation layer.

Examples of specific embodiments of a triggering mechanism are casing substances which can be changed through heat, through mechanical, electrical or chemical action or through irradiation. These casing substances can encapsulate the previously outlined active substances, which are likewise provided in the means for reducing the gas pressure.

For example, parts of the insulation assembly can be cooled by commencement of the conveyance of cryogenic media through the component to be insulated, which releases active species through shrinkage and/or embrittlemennt of an encapsulation, whereupon the events which lead to a reduction in the number of gas moles start within the insulation through cooperation of the released active species.

This embodiment can be augmented inter alia by means of materials which have a different thermal expansion coefficient than the casing, so that cooling results in stress cracks in the casing substance or encapsulation, enabling events to take place which lead to a reduction in pressure. For example, water expands at decreasing temperatures below 4° C., whereas other substances contract in this range. This mechanism can be applied universally, so that the encapsulation may contain a material which on cooling contracts less than the material making up the encapsulation, herein also referred to as casing substance. This makes it possible to create on and/or within an encapsulation stresses which lead to destruction of the capsule casing. This mechanism can be employed alone or together with further mechanisms, for example an embrittling of the casing substance.

It is further possible for parts of the insulation assembly to be heated up for example by commencement of the conveyance of hot media through the component to be insulated, by electrical heating of electrical heating elements integrated in or on the insulation assembly, heating of constituents of the insulation assembly by means of microwave radiation or magnetic or electrical alternating fields, which causes the casing substances to melt, embrittle, degrade or in some other way to lose their barrier properties.

The heating elements can be embodied as resistance heating for example, in which case the heating elements are disposed particularly preferably at the edges of the insulation layer in order that the insulating performance of the insulation layer may not be adversely affected. Of course, the heating means, more particularly the heating elements can also be provided outside the casing of the vacuum insulation system, making it possible to achieve heating of the entire insulation system or of a defined region thereof. This can be effected by hot air blowers for example.

Specific heating can further be achieved through materials that can be heated up by the action of certain electromagnetic fields (for example microwaves, alternating magnetic fields or the like) or ultrasound. An example of materials which can be used in this way comprises the MagSilica® silica particles available from Evonik Degussa GmbH and loaded with magnetizable metals, particularly iron.

These materials can be provided in the vicinity of the substances which lead to a reduction in gas pressure, herein also referred to as active substances, or in the vicinity or as an element of a casing substance, which optionally encases an active substance, so that action of the appropriate electromagnetic fields or ultrasound can achieve very local heating which leads to an activation of the means for reducing the gas pressure.

In addition to the casing melting, the casing can also be destroyed by providing a material having a high thermal expansion coefficient, which can optionally also be vaporized, within the encapsulation. The thermal expansion can break the encapsulation apart. For example, water can be provided within an encapsulation. The pressure created by the vaporization of water can be used to destroy the encapsulation. It is further possible to provide a metal having a high thermal expansion coefficient within an encapsulation formed for example of a polymeric material or an inorganic glass, for example silicate glass. The powerful thermal expansion of the metal, compared with the casing substance, can cause the encapsulation to become destroyed by heating.

The water released by the mechanisms outlined above can be removed again from the gas phase by driers for example in order that a sufficiently low gas pressure may be achieved.

In addition, parts of the insulation assembly can be heated up for example by commencement of the conveying of hot media through the component to be insulated, by electrically heating of electrical heating elements integrated within or on the insulation assembly or heat actions from outside the insulation system, to provide the activation energy needed for chemical reaction (for example decomposition reaction to form active species or else the direct reaction between existing species which reduces the number of gas moles). Similar heating of constituents of the insulation assembly can be achieved by means of microwave radiation or magnetic or electric alternating fields etc in the manners already described.

These events can further be kicked off by the insulation assembly being exposed to sufficiently penetrating or transmissive ionizing radiation to initiate chemical processes such as the formation of free radicals or reactive ionic species which in turn start the desired reactions reducing the number of gas moles.

In a further embodiment of the present invention, activation can be effected through direct action of microwave radiation on certain materials in the insulation assembly capable of absorbing the radiated energy and thereby heating up substantially. The heating can cause these or adjacent materials to become chemically or physically activated; for example through decomposition/destruction of encapsulations, activation of catalysts, formation of free radicals or reactive ionic species, etc, whereupon the events which reduce the number of gas moles start within the insulation through cooperation of the active species.

It is further possible for magnetic or electric fields to act on certain materials in the insulation assembly to cause these to become chemically or physically activated, for example displacement in mechanical movements (vibrations), which causes encapsulations to break open or solid components to rub against each other (reaction triggering through friction), or for example inductive heating of metal-containing auxiliary materials, whereupon the events which lead to a reduction in the number of gas moles start within the insulation through cooperation of the released and/or activated species.

It is further possible for mechanical actions on the ready-installed insulation assembly to release the materials to be activated, for example through fracture of brittle capsules, which can be made from inorganic glass in particular, trituration of externally passivated or encapsulated particles or the like. Suitable measures to achieve this can include inter alia action of ultrasound through externally applied sonotrodes, flexing of the outermost casing surrounding the insulation assembly at installation, inflating a hollow casing around the insulation assembly or hoses or the like introduced into the insulation assembly (and hence pressing on the insulation assembly), and so on, whereupon the encapsulation is broken and a reduction in pressure takes place.

Many of the abovementioned triggering mechanisms are based on encasing one or more usually solid or liquid materials which on free contact with the filling gas spontaneously undergo a physico-chemical event whereby the number of moles of the gas is reduced. An encasing accordingly causes the means for reducing the gas pressure to be embodied as activatable, so that control of the triggering of the gas mole number reducing event can be achieved. The encasing initially prevents this otherwise spontaneous event and so provides for simple production of the entire insulation assembly at atmospheric pressure conditions or at any rate higher gas pressures than required in the ready-produced operative insulation assembly for achieving a desired insulating effect.

For example, the means for reducing the gas pressure can be embodied as activatable by providing a casing substance which surrounds a basic substance, an addition polymerization catalyst/initiator or a metal and/or a metal alloy. Operating a triggering mechanism causes the barrier properties of the casing formed by the casing substance to change such that the previously outlined events (for example reactions, absorptions or adsorptions) can take place with the result of a reduced gas pressure in the insulation layer.

The casing formed by the casing substance around the active substance has, in a preferred modification of the present invention, a very low gas permeability to thereby ensure a long shelf life of the component for producing a vacuum insulation system. The gas permeability is dependent on the nature of the casing material and on the thickness of the casing in that a thicker casing will generally lead to a lower gas permeability. However, the exact gas permeability is dependent on the nature of the use and the contemplated shelf life. For many applications, the casing can have a relatively high gas permeability. It is thus in many cases sufficient to have means for reducing the gas pressure which before activation display a pressure reduction by at most 5% after an observation time of at least 2 hours under the gas provided for reaction. Preferably, the pressure reduction is at most 2% and more preferably at most 1% following an observation time of at least 2 hours. These values are measured at 25° C. and without the means for reducing the gas pressure having been activated. The initial gas pressure here is 1000 mbar and the gas includes at least 99.5% by volume of gas provided for reaction.

This value relates to the gas which is present in the insulation layer and which after activation of the means for reducing gas pressure is absorbed and/or adsorbed by this means and/or reacts with this means. Preference is given to using an acidic gas, more particularly carbon dioxide, so that these values relate more particularly to carbon dioxide permeability.

The activation of the means for reducing the gas pressure causes the casing formed around the active substance by the casing substance to become gas permeable. It may be noted in this connection that this casing can also become completely destroyed in the process. After activation, the permeability of the casing possibly present around the active substance increases. The pressure reduction after activation is thus at least 10% after a time of at least 2 hours, based on the starting gas pressure prior to activation. The period of 2 hours relates to the start time of activation. Preferably, the pressure reduction is at least 20% and more preferably at least 50% following a time of least 2 hours. To determine these values, the starting gas pressure is preferably at least 900 mbar, the gas in the insulation layer before activation including at least 99.5% by volume of the gas provided for reaction, preferably an acidic gas, more preferably carbon dioxide. The pressures here preferably relate to a temperature of 25° C.

In a particular modification, the pressure reduction due to gas permeability of the casing around the means for reducing the gas pressure can increase very substantially after activation. The quotient thus formed from the pressure reduction after activation and the pressure reduction before activation is at least 2, more preferably at least 10 and even more preferably at least 100, based on the gas in the insulation layer beforehand and an observation time of in each case at least 2 hours, wherein the pressure recitations each relate to a temperature of 25° C.

The casing substance can be for example a wax or some other substance which melts on heating, so that the casing degraded and, for example the basic substance previously encased by the wax can react with the carbon dioxide. Preferred substances useful as casing substance have a melting temperature in the range from 30 to 150° C. and more preferably in the range from 50° to 70° C. Preferred casing substances include inter alia waxes, paraffins, fats, oils, fatty alcohols, fatty acids, gum acacia, gum arabic, polyethylene glycols and their copolymers, and also mixtures of two or more of these classes. Examples of such casing substances are: stearic acid (melting points about 70° C.), palmitic and margaric acid (melting points around 62° C.), all types of Vestowax® (melting point about 90-120° C., from Evonik Tego GmbH), palm fat (melting point about 27-45° C.), beeswax (melting point 62-65° C.), carnauba wax (melting point 80-87° C.), wool wax (lanolin, melting point from about 40° C.), ceresine (melting point about 62-80° C.) All the fatty acids, fats and natural waxes mentioned are obtainable from a multiplicity of producers. Paraffin waxes are obtainable inter alia from Sasol, Shell and almost all other petroleum-processing companies under a multiplicity of trade names.

In the case of casings whose activation mechanism comprises a casing substance melting, it can be advantageous to supply throughout the entire pressure reduction event sufficient energy, more particularly heat, for the casing substance not to form a new casing around the active substance before the pressure has not dropped to the envisioned value. When using means for reducing the gas pressure where the activation mechanism comprises a casing substance melting surprising advantages can be achieved by mixing these means with substances capable of taking up molten casing substance. These substances include more particularly porous materials, such as the previously outlined porous inorganic carrier materials for example. When such substances are used, the weight ratio of means for reducing the gas pressure to substance capable of taking up molten casing substance can be in the range from 100:1 to 1:100, preferably in the range from 10:1 to 1:10 and more preferably in the range from 2:1 to 1:2. Of interest here are more particularly embodiments wherein the means for reducing the gas pressure and the substance capable of taking up molten casing substance are each particulate and finely mixed.

It is further possible for example for a casing substance to become embrittled through cold, so that the casing formed for a basic substance for example is destroyed as a result. This destruction of the casing can be augmented for example through mechanical action as previously outlined by way of example. Examples of materials which embrittle are more particularly plastics, but also many waxes and fats, and also proteins and materials constructed thereof. Embrittling can preferably be achieved at a temperature in the region of below 20° C., more preferably in the region of below 5° C. and even more preferably in the region of below −30° C.

The weight ratio of casing substance and active substance can vary within wide limits when activatability is achieved through the use of a casing. The thicker the casing, the less generally speaking the gas permeability, unless other factors such as for example the nature of the casing material are discounted. On the other hand, a very thick casing can, in certain circumstances, lead to problems with regard to activatability, since the gastightness of the casing has to be significantly reduced in the course of activation. For many purposes, it is accordingly advantageous to use means for reducing the gas pressure where the weight ratio of active substance to casing substance is in the range from 50:1 to 1:10, preferably in the range from 10:1 to 1:1 and more preferably in the range from 5:1 to 2:1 when the means for reducing the gas pressure includes a casing substance.

In a particular embodiment, the means for reducing the gas pressure includes a casing. This encapsulation of the active substance can be effected for example through a matrix encapsulation and/or a core-casing encapsulation. The production of systems featuring encasing or encapsulation is widely known in the prior art. Various methods are suitable for this, in particular coacervation, RESS, GAS and/or PGSS processes and also processes using coaxial nozzles, spray drying, fluidized bed coating as well as microencapsulation. It is further possible, when porous carrier materials are used, for the pores filled with active substance to be closed. Closing the pores with a casing substance can be effected in a similar manner to the loading of the porous carrier material with active substance.

With regard to the addition polymerization catalysts/initiators, it is to be noted that the half life of many free-radical formers is dependent on the temperature. Accordingly, the means for reducing the gas pressure can also consist of an addition polymerization catalyst/initiator which is specifically heated to form free radicals, which polymerize the addition-polymerizable gas in the insulation layer. The half lives of the previously outlined initiators at different temperatures are known. Heating to appropriate temperatures typically leads to a number of free radicals sufficient to trigger the addition polymerization reactions described, which in turn lead to a reduction in pressure.

In many cases, the envisioned activation mechanism for the means for reducing the gas pressure is irreversible. It is a preferred aspect of the present invention that the component may include two or more means for reducing the gas pressure which can be specifically activated through different mechanisms or through different actions. This embodiment makes it possible for the pressure-reducing event to be performed repeatedly. This can be sensible in order, for example after maintenance, repair or the like, to be able to form a vacuum again through the previously described events, i.e., reactions, absorptions or adsorptions. In these embodiments, the insulation layer of the inspected or repaired insulation system can first be flushed with an appropriate gas which after gastight closing of the insulation layer is reacted, absorbed or adsorbed from the insulation layer in the previously described manner through chemical or physical events.

In a further modification, by utilizing various means for reducing the gas pressure which are specifically activatable through different mechanisms or through different actions, excessive local heating can be avoided for example by initially reacting only relatively small amounts of active substance with the gas in the insulation layer. In further steps, following appropriate cooling, further means for reducing the gas pressure are activated.

This embodiment, which includes a plurality of different means for reducing the gas pressure, further makes it possible to ensure a low gas pressure over a very long period. In this case, the means for reducing the gas pressure can differ in active substance. In a first step, a main portion of the gas in the insulation layer, more particularly an acidic gas, preferably carbon dioxide, can therefore be reacted with a first active substance, preferably a basic substance, to thereby achieve a very low gas pressure. This gas pressure can preferably be at most 50 mbar, more preferably at most 10 mbar and even more preferably at most 1 mbar.

In a later step, residues of oxygen, nitrogen or gases other than carbon dioxide which are possibly present in the insulation layer can be bound by further active substances. The insulation layer may contain these gases in a small proportion before activation. Accordingly, the present component can also be produced using an acidic gas, more particularly carbon dioxide, which has a relatively low degree of purity. The proportion of noble gases, more particularly argon, in the insulation layer is preferably not more than 0.1% by volume, more preferably not more than 0.01% by volume and even more preferably not more than 0.001% by volume. Typical technical grade carbon dioxide includes a very low level of noble gases. Furthermore, gases such as oxygen or nitrogen for example can build up over time in the insulation layer as a result of diffusion. The further means for reducing the gas pressure may comprise as active substance for example lithium or some other substance which binds these gases, more particularly nitrogen or oxygen. This embodiment accordingly provides a particularly efficient way of obtaining vacuum insulation systems having excellent performance capability. Accordingly, particularly preferred systems include at least two means for reducing the gas pressure which differ in terms of activatability and active substance.

Accordingly, preferred modifications may comprise at least two different means for reducing the gas pressure which may preferably differ in active substance. Of interest here more particularly are modifications which in addition to a basic substance comprise a further active substance, for example a substance which binds nitrogen or oxygen. Particular advantages are surprisingly achievable when the weight ratio of basic substances to other active substances which preferably bind nitrogen or oxygen is preferably in the range from 10 000:1 to 10:1 and more preferably in the range from 1000:1 to 50:1.

The component according to the present invention is used more particularly for producing vacuum insulation systems. The term vacuum insulation system describes a thermally insulated system whose insulating performance is improved by vacuum. Vacuum is to be understood in this connection as meaning that the absolute pressure in the insulating material is preferably not more than 500 mbar, more preferably not more than 50 mbar even more preferably not more than 10 mbar and yet even more preferably not more than 1 mbar. As a result, the thermal conductivity of the insulating material is greatly reduced.

Preferred vacuum insulation systems are used more particularly for transportation of cold fluids, more particularly liquids, which preferably have a temperature of at most −40° C., more preferably at most −100° C. and even more preferably −150° C. or less.

In addition to cold fluids, a line system according to the present invention can also be used to transport hot fluids, i.e., fluids having a temperature above the room temperature of about 25° C. The temperature of hot fluids is preferably at least 50° C. and more preferably at least 80° C.

The preferred line systems described above comprise at least one line or line assembly capable of transporting a fluid.

The term line assembly refers in the context of the present invention to a system comprising at least two different lines. For instance, the line assembly may include two or more inner lines capable of transporting liquids or gases. In addition, the line assembly may also comprise at least one inner line for the transportation of liquids and/or gases and at least one data and/or electric power line. Particularly preferred line assemblies comprise at least two inner lines for transportation of a material and at least one data and/or electric power line.

In general, these lines or line assemblies comprise at least one inner line and an outer sheath wherein the cold or hot fluid is conducted through the inner line and the outer sheath shuts the line off from the environment, so that a vacuum can form between the inner line and the outer sheath. Accordingly, the outer sheath serves more particularly to maintain the insulating effect.

To improve the barrier properties, the outer sheath can be given a coat of metal. This coat of metal can be applied for example by a vapor deposition of metal, via a metal-containing lacquer or via a metal foil. This can take place on the outer surface, on the inner surface, or both.

Appropriate choice of material can serve to render the line or line assembly of the vacuum system bendable at room temperature. The materials more particularly to produce the inner line and the outer sheath are general common knowledge and more particularly are recited in the printed publications cited above. Preferably, the line or line assembly of an insulation system according to the present invention can have permissible bending radii of less than 20 m, more preferably less than 10 m, even more preferably less than 5 m and yet even more preferably less than 1.5 m. The bending radius results from the maximum curvature which can be achieved without damaging the line or line assembly. Damaging means that the system is no longer fit for purpose.

In addition to the above-described line assemblies, more particularly useful for transferring cold or hot fluids, i.e., gases or liquids, the components according to the present invention can be used for many purposes.

For example, the component according to the present invention can be used in the field of district heating, process steam and other heat transfer systems, for insulating buildings, in building technology, for insulating pipework lines conducting hot tap water as well as heating water, in the construction of reactors and apparatuses used for industrial purposes in particular, in the manufacture of PCM stores, means of transport, more particularly refrigerated vehicles, aircraft, or in other applications of cold or heat engineering. Owing to its relatively low costs, good processability and handlability, the component can here be used for various purposes. For instance, refrigerators and deep-freezers can be manufactured in a simple manner in that even complex shapes can be safely and simply insulated without having to accept long cycle times in the manufacturing operation.

Embodiments of the invention will now be more particularly described by way of example without any limitation thereof being intended.

EXAMPLE 1

The test which follows shows that a pressure reduction due to $CO_2$ absorption on NaOH reduces the thermal conductivity of an insulating material. A vacuum-capable, gastight stainless steel container was used, and an insulating material was introduced into its interior. The thermal conductivity of these insulating materials was determined by means of the hot-wire method (reference: Ebert H.-P., Bock V., Nilsson O., Fricke J.: The Hot-Wire Method Applied to Porous Materials of Low Thermal Conductivity. High Temp—High Press 1993 (25) 391-402).

Within the container there was a second gastight container, the inner volume of which was 1/10 of the inner volume of the outer container. The inner volume of the inner container was connectable to the inner volume of the outer container via a valve, so that when the valve was closed the two gas spaces were divided from each other and when the valve was open the two gas spaces were in communication with each other. The valve in question could be operated from outside the outer container. Accordingly, the pressure reduction means was mechanically activatable.

The insulating material introduced into the inner compartment of the outer container comprised mixtures of silicas and carbon blacks (80 parts by mass of Sipernat® 22LS and 20 parts by mass of Flammruβ F101® lamp black, both from Evonik Degussa GmbH).

Furthermore, the inner container was filled with a mixture of 1 part by volume of commercially available NaOH on inert material for $CO_2$ absorption (Merck 101564: sodium hydroxide on support for elemental analysis, particle size 1.6-3 mm) and 2 parts by volume of silica (for example Aerosil® A300 from Evonik Degussa GmbH).

Then, the valve between the inner and the outer containers was opened and the entire setup was mechanically evacuated down to about 1 hPa. The arrangement was kept at this low pressure for 1 hour with the vacuum pump running.

Thereafter, the valve between the inner and outer containers was closed and the gas volume of the outer container was flooded with $CO_2$ until about 1000 hPa total pressure at room temperature was achieved.

The molar use ratio of NaOH in the inner container to $CO_2$ in the insulation space was 4:1.

Under a $CO_2$ atmosphere at a total pressure of 1000 hPa, at room temperature, the thermal conductivity of the insulating material was measured at 22 mW/(m*K).

In this state, the system was observed for a period of 24 hours. No changes whatsoever occurred in the gas pressure in the outer container and similarly the thermal conductivity of the insulating material remained constant.

Subsequently, the valve was opened. Within just 70 seconds the gas pressure in the outer container dropped from around 1000 hPa to around 600 hPa, and after 2 hours values below 20 hPa and after 4 hours finally below 3 hPa were reached. In the course of this pressure reduction, the thermal conductivity of the insulating material also reduced to 2 mW/(m*K), i.e., by more than 90% compared with the value at standard pressure.

EXAMPLE 2

Example 1 was essentially repeated except that the unencapsulated or uncased NaOH particles supported on inert material were replaced by particles having a meltable casing. Accordingly, the pressure reduction means was thermally activatable.

These particles were obtained by providing the particles described in example 1 (NaOH on inert porous carrier, particle size 1.6-3 mm; Merck 101564: sodium hydroxide on carrier, for elemental analysis) with a stearic acid layer. To this end, these particles (total amount of NaOH introduced 6 g) were encapsulated with stearic acid (total amount 2 g) by mixing the materials and mixing the mixture in a kneader at 100° C. for 2 hours.

The thermally activatable particles obtained were mixed with 3 g of pulverulent insulating materials (carbon black, silica, talc) and sealed gastight. Then, the outer gas volume was filled with carbon dioxide. To this end, the gas volume was three times evacuated with a pump with a pressure of less than 1 mbar and charged with $CO_2$ gas (99.9% by volume).

After gas exchange, the total gas pressure was about 998 mbar. Thereafter, the gastight container, and hence the encapsulated particles, were heated. After heating the gastight container to more than 75° C., a continuous reduction in pressure occurred. After about 100 minutes, the gas pressure had dropped to 24 mbar. The experiment was terminated.

EXAMPLE 3

Example 2 was essentially repeated except that the particles described above were replaced by pressure reduction means including a higher proportion of casing substance.

These particles were produced by dissolving 10 g of NaOH (anhydrous) in 100 ml of ethanol (99.8%) and thereafter gradually adding 20 g of Sipernat® 50 (Evonik Degussa GmbH) with stirring. The composition obtained was homogenized for 1 hour. Then, this composition was dried at 70° C. for 24 h, whereupon the solid particles contained about 33% by weight of NaOH. Subsequently, these particles (30 g) were mixed with 20 g of paraffin (Sasolwax®6037 from Sasol) in a kneader at 100° C. for 2 hours to achieve an encapsulation.

The particles obtained (corresponding to 6 g of NaOH) were mixed with 3 g of pulverulent insulating materials (carbon black, silica, talc) and introduced into the measuring arrangement of example 1. The air contained in the container was exchanged for carbon dioxide. To this end, the container was three times or thereabouts evacuated with a pump with a pressure of less than 1 mbar and charged with $CO_2$ gas (99.9%; by volume).

After gas exchange, the total gas pressure was about 993 mbar. Thereafter, the gastight container, and hence the encapsulated particles, were heated. After heating the gastight container to more than 90° C., a continuous reduction in pressure occurred. After about 90 minutes, the gas pressure had dropped to 36 mbar. The experiment was terminated.

We claim:

1. A component comprising at least one insulation layer which is surrounded by a casing, wherein the gas pressure in the insulation layer can be reduced by an activatable pressure-reducer provided in the component, and wherein the gas in the insulation layer comprises an addition-polymerizable gas, and the activatable pressure reducer comprises at least one addition polymerization catalyst/initiator whereby the addition-polymerizable gas can be addition polymerized.

2. The component according to claim 1, wherein the activatable pressure reducer adsorbs and/or reacts with the gas in the insulation layer, the gas in the insulation layer further comprises carbon dioxide, and the activatable pressure reducer comprises a basic substance capable of adsorbing and/or reacting with carbon dioxide.

3. The component according to claim 1, wherein the gas in the insulation layer further comprises carbon dioxide, and the gas in the insulation layer contains said carbon dioxide in an amount of less than 100% but at least 90% by volume of carbon dioxide.

4. The component according to claim 1, wherein the gas pressure is at least 800 mbar before activation.

5. The component according to claim 1, wherein the activatable pressure reducer comprises an active substance encapsulated by a casing substance.

6. The component according to claim 1, wherein before activation the activatable pressure reducer displays a pressure reduction by at most 5% after an observation time of at least two hours under the gas provided for reaction.

7. The component according to claim 1, wherein the quotient formed from the pressure reduction after activation and the pressure reduction before activation is at least 10, based on the gas in the insulation layer and an observation time of at least two hours.

8. The component according to claim 1, wherein the activatable pressure reducer is provided in a cold region of the component.

9. The component according to claim 1, wherein the component comprises two or more activatable pressure reducers which differ in their modes of activation.

10. The component according to claim 1, wherein at least one drier is provided within the casing of the component.

11. The component according to claim 1, wherein the activatable pressure reducer comprises an active substance on a carrier material.

12. A vacuum insulation system comprising a component according to claim 1.

13. A process for forming a vacuum, comprising activating in a component according to claim 1, the activatable pressure-reducer.

14. The component according to claim 1, wherein the addition-polymerizable gas is ethylene.

15. The component according to claim 1, wherein the addition-polymerizable gas is propylene.

16. The component according to claim 1, wherein the addition-polymerizable gas is a mixture of ethylene and propylene.

* * * * *